US009333425B1

(12) United States Patent
Aschwanden

(10) Patent No.: US 9,333,425 B1
(45) Date of Patent: May 10, 2016

(54) PROVIDING INCENTIVIZED REDUCTION OF IN-GAME ACTIONS

(71) Applicant: Kabam, Inc., San Francisco, CA (US)

(72) Inventor: Pascal Aschwanden, San Mateo, CA (US)

(73) Assignee: KABAM, INC., San Francisco, CA (US)

( * ) Notice: Subject to any disclaimer, the term of this patent is extended or adjusted under 35 U.S.C. 154(b) by 70 days.

(21) Appl. No.: 13/657,703

(22) Filed: Oct. 22, 2012

(51) Int. Cl.
A63F 13/12 (2006.01)
A63F 13/30 (2014.01)

(52) U.S. Cl.
CPC ..................................... A63F 13/12 (2013.01)

(58) Field of Classification Search
CPC .................................. A63F 9/24; A63F 13/00
USPC ...................................................... 463/25, 42
See application file for complete search history.

(56) References Cited

U.S. PATENT DOCUMENTS

| 8,540,566 | B2* | 9/2013 | Gregory-Brown et al. | 463/25 |
| 2009/0006247 | A1 | 1/2009 | Hansen et al. | 705/39 |
| 2012/0015715 | A1* | 1/2012 | Luxton et al. | 463/25 |
| 2012/0040761 | A1* | 2/2012 | Auterio et al. | 463/42 |
| 2012/0122586 | A1* | 5/2012 | Kelly et al. | 463/42 |
| 2012/0122587 | A1* | 5/2012 | Kelly et al. | 463/42 |
| 2013/0079131 | A1* | 3/2013 | Lam et al. | 463/31 |
| 2014/0011595 | A1* | 1/2014 | Muller | 463/42 |

OTHER PUBLICATIONS

Freeman, Karen, "Scramble With Friends Has a Strange Flaw", Airport City, Jan. 7, 2012 boggle freemium in-app purchase scramble word game zynga;—App Advice; http://appadvice.com/appnn/20012/01/scramble-with-friends-is-a-major, printed Aug. 13, 2012 4:50 PM, 14 pages.

* cited by examiner

Primary Examiner — Jason Skaarup
(74) Attorney, Agent, or Firm — Sheppard Mullin Richter & Hampton LLP

(57) ABSTRACT

Users may be incentivized to reduce their overall in-game actions in a game. In-game actions may include actions of a first action type and actions of a second action type. Actions of the second action type may be enhanced versions of actions of the first action type. Actions of the first action type and actions of the second action type may have individual costs in resources that are available in the game. The game may include a plurality of resource types including a first resource type. The amount of resources of the first resource type controlled by a first user may be increased responsive to the first user refraining from inputting action requests for an action of the first action type over one or more time periods. Execution of an action of the second action type may have a cost of resources of the first resource type.

20 Claims, 7 Drawing Sheets

PROVIDING INCENTIVIZED REDUCTION OF IN-GAME ACTIONS

FIELD OF THE DISCLOSURE

This disclosure relates to providing incentives to users to voluntarily reduce initiation of various in-game actions, for example, the over-initiation of which may cause overutilization of network resources along with increased hardware and operational costs.

BACKGROUND

In many virtual games, users may devise scripts and/or other routines to automate various in-game actions such as sending their respective troops on "marches" to attack an enemy, to pick up resources, to support an ally, to patrol an area, and/or to perform other tasks. However, by automating these actions, users may cause overutilization of network resources and other problems for the back-end servers and, as a result, greatly increase hardware and operational costs. Conventional approaches to reducing overall in-game actions typically involve forcing the reduction of in-game actions, for instance, by throttling user actions. Nonetheless, reduction of in-game actions under these conventional approaches are limited since user actions may only be throttled to an extent before user discontent with such games becomes an issue. Accordingly, alternative approaches to force-based reduction of in-game actions may be advantageous.

SUMMARY

One aspect of the disclosure relates to a system configured to facilitate incentivized reduction of in-game actions, in accordance with one or more implementations. In exemplary implementations, overall initiation of in-game actions may be reduced by incentivizing users to voluntarily reduce their overall action requests for in-game actions, to voluntarily reserve requesting in-game actions for certain periods (e.g., low network resource utilization periods, designated time slots, etc.), to voluntarily request one type of in-game action in lieu of another type of in-game action, and/or perform other voluntary efforts, for instance, to mitigate the issues described herein. In some implementations, the system may include one or more servers. The server(s) may be configured to communicate with one or more client computing platforms according to a client/server architecture. The users may access the system via the client computing platforms, for instance, to engage in one or more games.

The server(s) may be configured to execute one or more computer program modules to provide one or more games to users (or players). The computer program modules may include one or more of a game module, a resource provisioning module, a resource record module, a communication module, and/or other modules. It is noted that the client computing platforms may include one or more computer program modules that are the same as or similar to the computer program modules of the server(s) to facilitate incentivized reduction of in-game actions.

The game module may be configured to execute an instance of a game to facilitate presentation of the game to a first user. The game module may be configured to implement in-game actions in the instance of the game in response to action requests for the in-game actions by the first user. The in-game actions may include actions of a first action type and actions of a second action type. The actions of the second action type may be enhanced versions of actions of the first action type. For example, actions of the second action type may be associated with greater benefits to users of the game (e.g., the first user and/or other users of the game) than corresponding actions of the first action type.

The game module may be configured such that actions of the first action type and actions of the second action type have individual costs in resources that are available in the game. The game may be provided via a virtual space, and may include a plurality of resource types.

The resource provisioning module may be configured to effectuate an increase of amounts of resources of the first resource type controlled by the users based on action requests from the users such that the amount of resources of the first resource type controlled by the first user is increased responsive to the first user refraining from inputting action requests for an action of the first action type over one or more time periods. The time periods may be time periods that are predetermined and fixed, time periods that are designated based on a level of the game, experience of the first user, and/or the time of the day, etc., and/or other time periods. In this way, users may voluntarily refrain from inputting action requests for particular in-game actions (e.g., the action of the first action type) for a period of time as a result of the incentive offered (e.g., the increase of the amount of resources of the first resource type for refraining from making requests for the action of the first action type for at least one of the time periods).

In certain implementations, the time periods may include one or more in-game time periods. By way of example, in-game time periods may be periods of time with respect to an instance of a virtual space in which the game is implemented (e.g., without necessarily having to rely on what the actual time is in the real world).

In some implementations, resources of the first resource type may include resources that cannot be acquired via one or more of purchase or trade (e.g., purchases with virtual currencies, purchases with real-world currencies, trade for virtual items or services, trade for real-world items or services, etc.). In this way, because the resources of the first resource type may not easily be obtained, such as through purchase or trade, resources of the first resource type may appear to be a special resource type to users, which may increase their desire to voluntarily refrain from inputting action requests for certain in-game actions to obtain more resources of the special resource type. Even when voluntarily refraining from particular in-game actions is not a condition for obtaining more resources of the special resource type, eliminating purchase and trade as options to obtain more resources of the special resource type may be effective in limiting in-game actions such as in-game actions where the cost of performing those in-game actions entails a certain cost of the resources of the special resource type.

In certain implementations, the resource provisioning module may be configured to effectuate an increase of amounts of resources of the first resource type controlled by the users based on action requests from the users such that the amount of resources of the first resource type controlled by the first user is increased responsive to passage of one or more recharge periods. The recharge periods may, for instance, include one or more in-game time periods as described above.

The resource record module may be configured to maintain user resource records. For example, the user resource records may include a first resource record for the first user that indicates amounts of resources of the individual resource types that the first user controls in the game including an amount of resources of the first resource type controlled by the first user.

The communication module may be configured to obtain action requests input by users, wherein action requests specify execution of in-game actions. The game module may be configured such that execution of an action of the second action type has a cost of resources of the first resource type. In some implementations, the communication module may be configured to obtain an action request for the action of the second action type by the first user. The game module may be configured to effectuate execute the action of the second action type responsive to a determination that the amount of resources of the first resource type controlled by the first user is sufficient to satisfy the cost of resources of the first resource type associated with execution of the action of the second action type.

In some implementations, the resource provisioning module may be configured to, in response to a determination that the action request for the action of the second action type specifies execution of the action of the second action type during one or more of periods associated with low network resource utilization or periods associated with time slots designated for adjustments, effectuate one or more of an adjustment of a recharge period associated with increasing the amount of resources of the first resource type controlled by the first user or an adjustment of the cost of resources of the first resource type associated with execution of the action of the second action type.

In certain implementations, the payment module may be configured to obtain payment from the first user for one or more resource slots that store resources of the first resource type. The resource provisioning module may be configured such that increasing the amount of resources of the first resource type controlled by the first user is responsive to the first user having one or more empty resource slots.

In various implementations, the resource provisioning module may be configured to, in response to an action request for the action of the first action type by the first user, effectuate one or more of a decrease of the amount of resources of the first resource type controlled by the first user or a reduction of the amount of resources of the first resource type controlled by the first user that is increased based on the first user refraining from inputting action requests for the action of the first action type. In some implementations, the resource provisioning module may be configured to effectuate a decrease of the amount of resources of the first resource type controlled by the first user responsive to execution of the action of the second action type, such that the amount of resources of the first resource type controlled by the first user is decreased by the cost of resources of the first resource type associated with execution of the action of the second action type.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
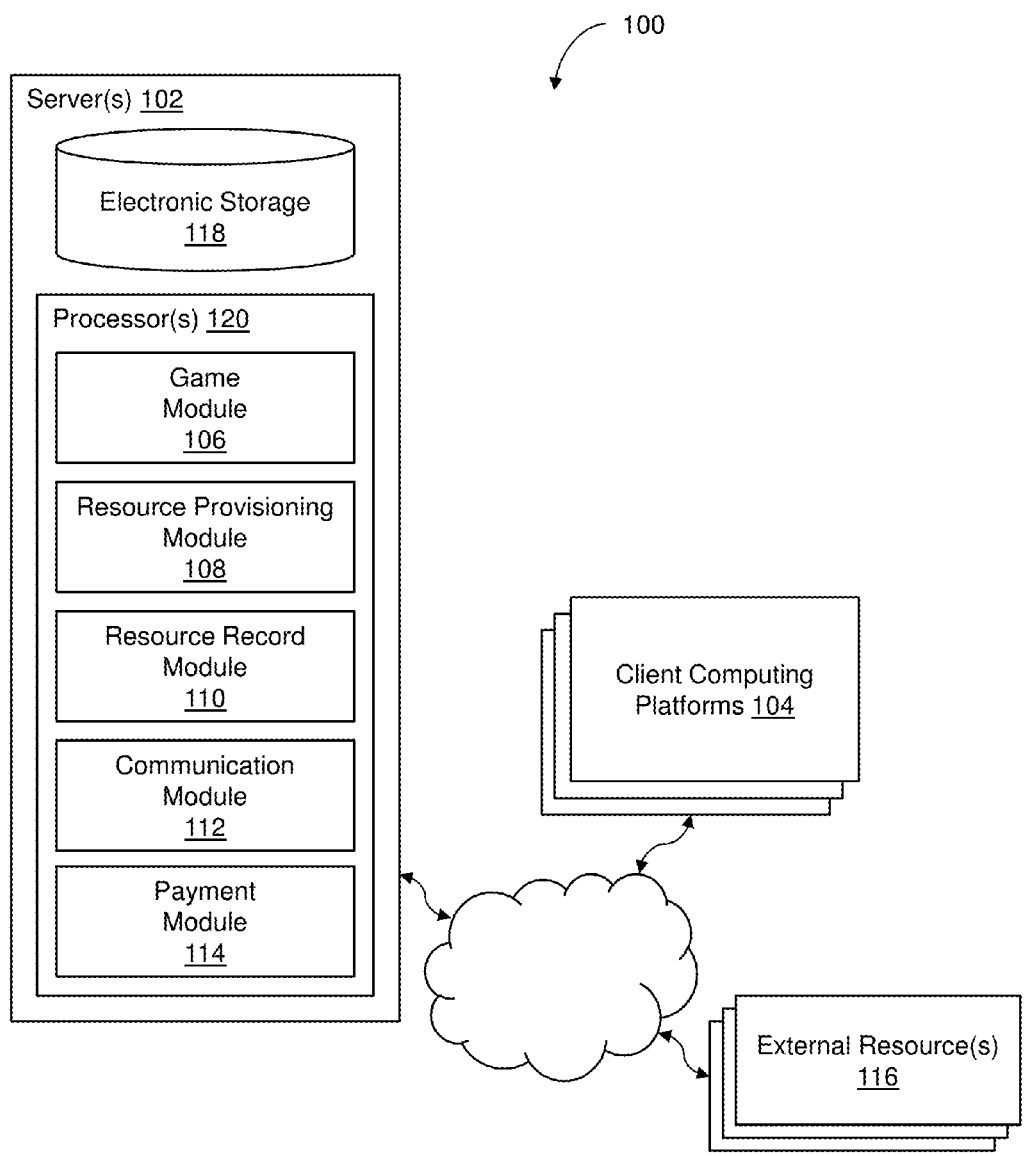
FIG. 1 illustrates a system configured to facilitate incentivized reduction of in-game actions, in accordance with one or more implementations.

FIG. 1 illustrates a system 100 configured to facilitate incentivized reduction of in-game actions, in accordance with one or more implementations. In exemplary implementations, overall initiation of in-game actions may be reduced by incentivizing users to voluntarily reduce their overall action requests for in-game actions, to voluntarily reserve requesting in-game actions for certain periods (e.g., low network resource utilization periods, designated time slots, etc.), to voluntarily request one type of in-game action in lieu of another type of in-game action, and/or perform other voluntary efforts, for instance, to mitigate the issues described herein. In some implementations, system 100 may include one or more servers 102. The server(s) 102 may be configured to communicate with one or more client computing platforms 104 according to a client/server architecture. The users may access system 100 via client computing platforms 104, for instance, to engage in one or more games.

The server(s) 102 may be configured to execute one or more computer program modules. The computer program modules may include one or more of a game module 106, a resource provisioning module 108, a resource record module 110, a communication module 112, a payment module 114, and/or other modules. As noted, the client computing platforms 104 may include one or more computer program modules that are the same as or similar to the computer program modules of the server(s) 102 to facilitate incentivized reduction of in-game actions.

The game module 106 may be configured to execute an instance of a game to facilitate presentation of the game to a first user. The game module 106 may be configured to implement in-game actions in the instance of the game in response to action requests for the in-game actions by the first user. The in-game actions may include actions of a first action type and actions of a second action type. The actions of the second action type may be enhanced versions of actions of the first action type. For example, actions of the second action type may be associated with greater benefits to users of the game (e.g., the first user and/or other users of the game) than corresponding actions of the first action type. By way of example, actions of the first action type may include regular "marches" by one or more character units that are associated with a user of a game. The regular marches may, for instance, include: (1) attack marches (e.g., sending an army to enemy's castle with the purpose of stealing resources, destroying the army of the enemy, conquering the castle, etc.); (2) clean-up marches (e.g., sending an army to either another user's castle or a field on the map with the purpose of picking up resources, wounded soldiers remaining after a battle or a camp, etc.); (3) patrol marches (e.g., sending an army on a trip to a castle or a camp with the purpose of keeping the army safe away from the castle); (4) spy marches (e.g., sending an army to enemy's castle with the purpose of getting information about the enemy's resources, buildings, population, upgrades, support, etc.); (5) support marches (e.g., sending an army to a castle with the purpose of helping another user defeat his/her attacker); (6) and/or other marches.

The actions of the second action type may include enhanced (or augmented) marches corresponding to the regular marches by the character units of the game. Compared with a regular march, for instance, a corresponding enhanced march may provide a greater benefit to the user with respect to the game when the enhanced march is performed than when the regular march is performed. As an example, compared with a regular march, a corresponding enhanced march may provide increased attack damage (e.g., during attack marches, support marches, etc.), reduced troop losses (e.g., during patrol marches, support marches, etc.), greater gain on resources recovered (e.g., during clean-up marches), higher chances of finding rare items (e.g., during clean-up marches), etc. As such, the enhanced march may be an enhanced version of the corresponding regular march.

The game module 106 may be configured such that actions of the first action type and actions of the second action type have individual costs in resources that are available in the game. For example, execution of actions of the first action type may have a cost of resources of a second resource type, while execution of actions of the second action type may have a cost of resources of a first resource type that is different from the second resource type (e.g., the first resource type may be "crystals," while the second resource type may be "wood").

The game may be provided via a virtual space, and may include a plurality of resource types. An instance of the virtual space may be executed by computer modules to determine views of the virtual space. The views may then be communicated (e.g., via streaming, via object/position data, and/or other information) from server(s) 102 and/or other source to client device(s) 104 for presentation to users. The view determined and transmitted to a given client device 104 may correspond to a user character being controlled by a user via the given client device 104. The view determined and transmitted to a given client device 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency (e.g., resources of the plurality of resource types) that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102.

The resource provisioning module 108 may be configured to effectuate an increase of amounts of resources of the first resource type controlled by the users based on action requests from the users such that the amount of resources of the first resource type controlled by the first user is increased responsive to the first user refraining from inputting action requests for an action of the first action type over one or more time periods. The time periods may be time periods that are predetermined and fixed, time periods that are designated based on a level of the game, experience of the user, and/or the time of the day, etc., and/or other time periods. As discussed, under this approach, users may voluntarily refrain from inputting action requests for particular in-game actions (e.g., the action of the first action type) for a period of time as a result of the incentive offered (e.g., the increase of the amount of resources of the first resource type for refraining from making requests for the action of the first action type for at least one of the time periods).

In various implementations, the amounts of resources of other resource types of the plurality of resource types of the game may be "typical" resources that may be increased for a user through in-game and/or real-world actions initiated by the user, such as through battling, investing in virtual facilitates (e.g., buildings, equipment, etc.), directly purchases of and/or trades for the resources of the other resource types, achievements of the user (e.g., getting to the next level, winning a battle, completing a mission, etc.), gambling by the user, and/or other actions initiated by the user. As such, in some implementations, while the increasing of the amounts of resources of the other resource types may be dependent on actions taken by the user, recharging and/or increasing of the amount of resources of the first resource type may be dependent on the user not engaging in some type of action (e.g., refraining from inputting action requests for the action of the first action type).

In certain implementations, the time periods may include one or more in-game time periods. In-game time periods may be periods of time with respect to an instance of a virtual space in which the game is implemented (e.g., without necessarily having to rely on what the actual time is in the real world). For example, a five-minute time period in the game may actually be a four-hour time period in the real world. Nonetheless, in another example, a five-minute time period in the game may be a five-minute time period in the real world.

In some implementations, resources of the first resource type may include resources that cannot be acquired via one or more of purchase or trade (e.g., purchases with virtual currencies, purchases with real-world currencies, trade for virtual items or services, trade for real-world items or services, etc.). As indicated, because the resources of the first resource type may not easily be obtained, such as through purchase or trade, resources of the first resource type may appear to be a special resource type to users, which may increase their desire to voluntarily refrain from inputting action requests for certain in-game actions to obtain more resources of the special resource type. As mentioned, eliminating purchase and trade as options to obtain more of the special resource type may be effective in limiting in-game actions even when voluntarily refraining from particular in-game actions is not a condition for obtaining more resources of the special resource type. For example, the number of in-game actions that are initiated by users may be limited where the cost of performing those in-game actions entails a certain cost of the resources of the special resource type.

In certain implementations, the resource provisioning module 108 may be configured to effectuate an increase of amounts of resources of the first resource type controlled by the users based on action requests from the users such that the amount of resources of the first resource type controlled by the first user is increased responsive to passage of one or more recharge periods. For example, the recharge periods may include the time periods in which a user must wait without requesting the action of the first action type to earn resources of the "special" resource type, time periods necessary for resources of the resource type to recharge, and/or other such time periods. In one use case, for instance, the amount of resources of the special resource type that are assigned to a user may be fixed (e.g., based on level, user experience, etc.), and the recharge periods may be a designated in-game time period that must go by before the fixed amount of the resources are completely recharged (e.g., 10 in-game minutes to recharge a single energy battery to 100% capacity).

Figure 2:
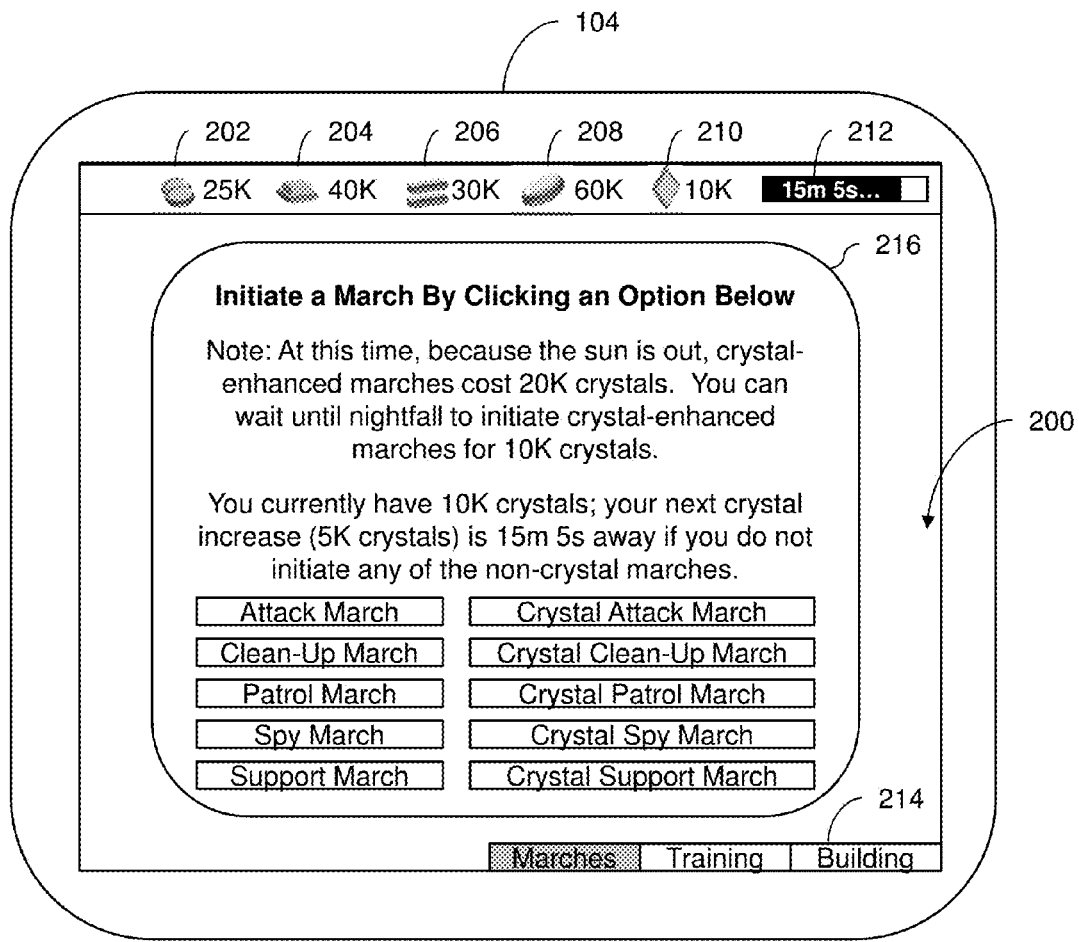
FIG. 2 illustrates a game scenario on a client computing platform that incentives reduction of in-game actions, in accordance with one or more implementations.

As discussed, the game may include a plurality of resource types. By way of example, the resource type of which the amount of resources are increased for the first user when the first user has not requested the action of the first action type (e.g., regular marches) for at least one of the time periods may be one of the resource types of the game. For instance, FIG. 2 illustrates a game scenario 200 on a client computing platform 104 that incentives reduction of in-game actions, in accordance with one or more implementations. As shown, the resource types in the game scenario 200 may include gold, iron, wood, food, and crystals (e.g., indicators 202, 204, 206, 208, and 210, respectively). While gold, iron, wood, and food may be resource types that can be obtained by a user through mining, smelting, logging, farming, and/or other active operations by character units associated with the user, crystals may be a special resource type that is distributed to a user responsive to passage of a recharge period or responsive to the user refraining from requesting regular in-game actions for the recharge period. In this case, time-remaining bar 212 indicates that there is 15 minutes and 5 seconds remaining in the recharge period. Game action type bar 214 indicates the various types of in-game actions offered in the game (e.g., marches, training, building, etc.). Selected information window 216 offers information regarding one of the general in-game action types (e.g., marches) along with options to request in-game actions of the in-game action type (e.g., regular marches, corresponding enhanced marches, etc.).

As an example, in some implementations, the user may receive an increase of crystals when the remaining time of the recharge period has passed. As another example, with respect to FIG. 2, the user may receive the increase of 5,000 crystals if the user does not initiate any of the regular marches (e.g., non-crystal marches) for the remaining time. In various implementations, the user must wait until the passage of one or more particular time periods before he/she is provided with an increase in crystals. In one example, the user may simply have to wait until a recharge period is over to obtain more crystals. In another example, the user may have to avoid initiation of non-crystal marches until the recharge period is over.

In certain implementations, the amount of time in the recharge periods that the user must wait and/or avoid initiation of non-crystal marches, the amount of crystals that the user obtains after each of the recharge periods, and/or the threshold of crystals that the user may have at a time may be adjusted based on any number of factors. For example, while crystals may be a non-purchasable and non-tradable resource type, a user may purchase or trade: crystal slots that may dictate the maximum number of crystals a user may have at a time; a time decrease in the recharge periods; and/or an increase in the amount of crystals that a user receives after each recharge period. In one scenario, for instance, a token may be purchased that enables the user to reduce a 2-hour recharge period by 25% such that the 2-hour recharge period becomes a 1.5-hour charge period when the token is activated. In another scenario, a token may be purchased that enables the user to increase a 5,000 crystal incentive for non-initiation of non-crystal marches for a 2-hour recharge period by 25% such that the user may receive 6,250 crystals when the user does not initiate non-crystal marches for the 2-hour recharge period.

The resource record module 110 may be configured to maintain user resource records. For example, the user resource records may include a first resource record for the first user that indicates amounts of resources of the individual resource types that the first user controls in the game including an amount of resources of the first resource type controlled by the first user.

The communication module 112 may be configured to obtain action requests input by users, wherein action requests specify execution of in-game actions. The game module 106 may be configured such that execution of an action of the second action type has a cost of resources of the first resource type. In some implementations, the communication module may be configured to obtain an action request for the action of the second action type by the first user. The game module 106 may be configured to effectuate execute the action of the second action type responsive to a determination that the amount of resources of the first resource type controlled by the first user is sufficient to satisfy the cost of resources of the first resource type associated with execution of the action of the second action type. By way of example, with respect to FIG. 2, the cost associated with execution of a crystal attack march may be 20,000 crystals such that 20,000 crystals will be deducted from the user's collection of crystals if the user requests execution of a crystal attack march. However, as shown in FIG. 2, the user currently does not have enough crystals to satisfy the cost associated with execution of a crystal attack march (e.g., the user currently only has 10,000 crystals). As such, the user may have to wait one or more recharge periods to obtained enough crystals to instigate the crystal attack march (e.g., the game module 106 may only execute the crystal attack march for the user when the user has at least 20,000 crystals).

In some implementations, the resource provisioning module 108 may be configured to, in response to a determination that the action request for the action of the second action type specifies execution of the action of the second action type during one or more of periods associated with low network resource utilization or periods associated with time slots designated for adjustments, effectuate one or more of an adjustment of a recharge period associated with increasing the amount of resources of the first resource type controlled by the first user or an adjustment of the cost of resources of the first resource type associated with execution of the action of the second action type. In one scenario, with respect to FIG. 2, the user may be provided with a ticker to alert the user of an optimal time to initiate a crystal march. This "optimal time" to initiate the crystal march may correspond to whenever the network resource utilizations are low. As such, the ticket may illuminate to notify the user that it is the optimal time to initiate a crystal march when network resource utilizations are below a certain predetermined utilization threshold (e.g., thresholds associated with utilization of processing resources, memory resources, connection bandwidth resources, etc.). In another scenario, still with respect to FIG. 2, certain time slots may be designated for adjustments of the recharge period to obtained crystals and/or adjustments of the cost of crystals for executing a crystal march. As an example, the period from midnight to noon (e.g., "nightfall" period in the game) may be designated as a time slot where execution of a crystal march will be 50% cheaper than typical costs associated with a crystal march, for instance, to encourage users to perform crystal marches during that time slot (e.g., the time slot may be when network resource utilization is known to be low, the time slot may be associated with a special event, etc.). As another example, the period from midnight to noon may be designated as a time slot where execution of a crystal march will cause a typical recharge period of 2 hours to become 1.5 hours for the next recharge period.

In certain implementations, the payment module 114 may be configured to obtain payment from the first user for one or more resource slots that store resources of the first resource type. The resource provisioning module 108 may be configured such that increasing the amount of resources of the first resource type controlled by the first user is responsive to the first user having one or more empty resource slots. By way of example, with respect to FIG. 2, the user may initially be given a single crystal container that enables the user to store up to 20,000 crystals (e.g., the crystal container has 20,000 crystal slots). If, for instance, the user already has 20,000 crystals, the user may be unable to obtain any more increases of crystals even when one or more recharge periods have passed or when the user has refrained from initiating a regular march for those recharge periods (e.g., since there are no crystal slots in the crystal container that are empty until he/she utilizes some of the crystals by initiating a crystal march). Thus, in such a scenario, the user may have to purchase another crystal container so that the user can store up to 40,000 crystals. In this way, a provider of the game may able to make money through user purchases of game features that are related to crystals, for instance, without making the crystals themselves purchasable and, thus, maintaining crystals as a "special" type of resource desired by users.

In various implementations, the resource provisioning module 108 may be configured to, in response to an action request for the action of the first action type by the first user, effectuate one or more of a decrease of the amount of resources of the first resource type controlled by the first user or a reduction of the amount of resources of the first resource type controlled by the first user that is increased based on the first user refraining from inputting action requests for the action of the first action type. For example, referring to FIG. 2, the user's amount of crystals may be reduced by 5,000 crystals if the user initiates a regular march within the remaining time in the recharge period. As another example, still referring to FIG. 2, the user's crystal increases per passage of a full recharge period may be reduced from 5,000 crystals to 4,000 crystals. These approaches may, for instance, be implemented to discourage the user from initiating regular marches too often since the user may desire to utilize the crystals for crystal marches as opposed to regular marches.

In some implementations, the resource provisioning module 108 may be configured to effectuate a decrease of the amount of resources of the first resource type controlled by the first user responsive to execution of the action of the second action type, such that the amount of resources of the first resource type controlled by the first user is decreased by the cost of resources of the first resource type associated with execution of the action of the second action type. For example, with respect to FIG. 2, if the cost associated with execution of a crystal spy march is 10,000 crystals, then the user's collection of crystals will be deducted by 10,000 crystals when the user initiates a crystal spy march.

In some implementations, server(s) 102, client computing platforms 104, and/or external resources 116 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platforms 104, and/or external resources 116 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 116, and/or provide other functionality attributed herein to client computing platforms 104. By way of non-limiting example, the given client computing platform 104 may include one or more of a desktop computer, a laptop computer, a handheld computer, a netbook, a smartphone, a gaming console, and/or other computing platforms.

The external resources 116 may include sources of information, hosts and/or providers of virtual spaces outside of system 100, external entities participating with system 100, and/or other resources. In some implementations, some or all of the functionality attributed herein to external resources 116 may be provided by resources included in system 100.

The server(s) 102 may include electronic storage 118, one or more processor(s) 120, and/or other components. The server(s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise electronic storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platforms 104, and/or other information that enables server(s) 102 to function as described herein.

Processor(s) 120 is configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. The processor(s) 120 may be configured to execute modules 106, 108, 106, 112, 114, and/or other modules. The processor(s) 120 may be configured to execute modules 106, 108, 110, 112, 114, and/or other modules by software; hardware; firmware; some combination of software, hardware, and/or firmware; and/or other mechanisms for configuring processing capabilities on processor(s) 120. As noted, in certain implementations, a given client computing platform 104 may include one or more computer program modules that are the same as or similar to the computer program modules of the server(s) 102. The given client computing platform 104 may include one or more processors that are the same or similar to processor(s) 120 of the server(s) 102 to execute such computer program modules of the given client computing platform 104.

It should be appreciated that although modules 106, 108, 110, 112, and 114 are illustrated in FIG. 1 as being co-located within a single processing unit, in implementations in which processor(s) 120 includes multiple processing units, one or more of modules 106, 108, 110, 112, and/or 114 may be located remotely from the other modules. The description of the functionality provided by the different modules 106, 108, 110, 112, and/or 114 described below is for illustrative purposes, and is not intended to be limiting, as any of modules 106, 108, 110, 112, and/or 114 may provide more or less functionality than is described. For example, one or more of modules 106, 108, 110, 112, and/or 114 may be eliminated, and some or all of its functionality may be provided by other ones of modules 106, 108, 110, 112, and/or 114. As another example, processor(s) 120 may be configured to execute one or more additional modules that may perform some or all of the functionality attributed below to one of modules 106, 108, 110, 112, and/or 114.

Figure 3:
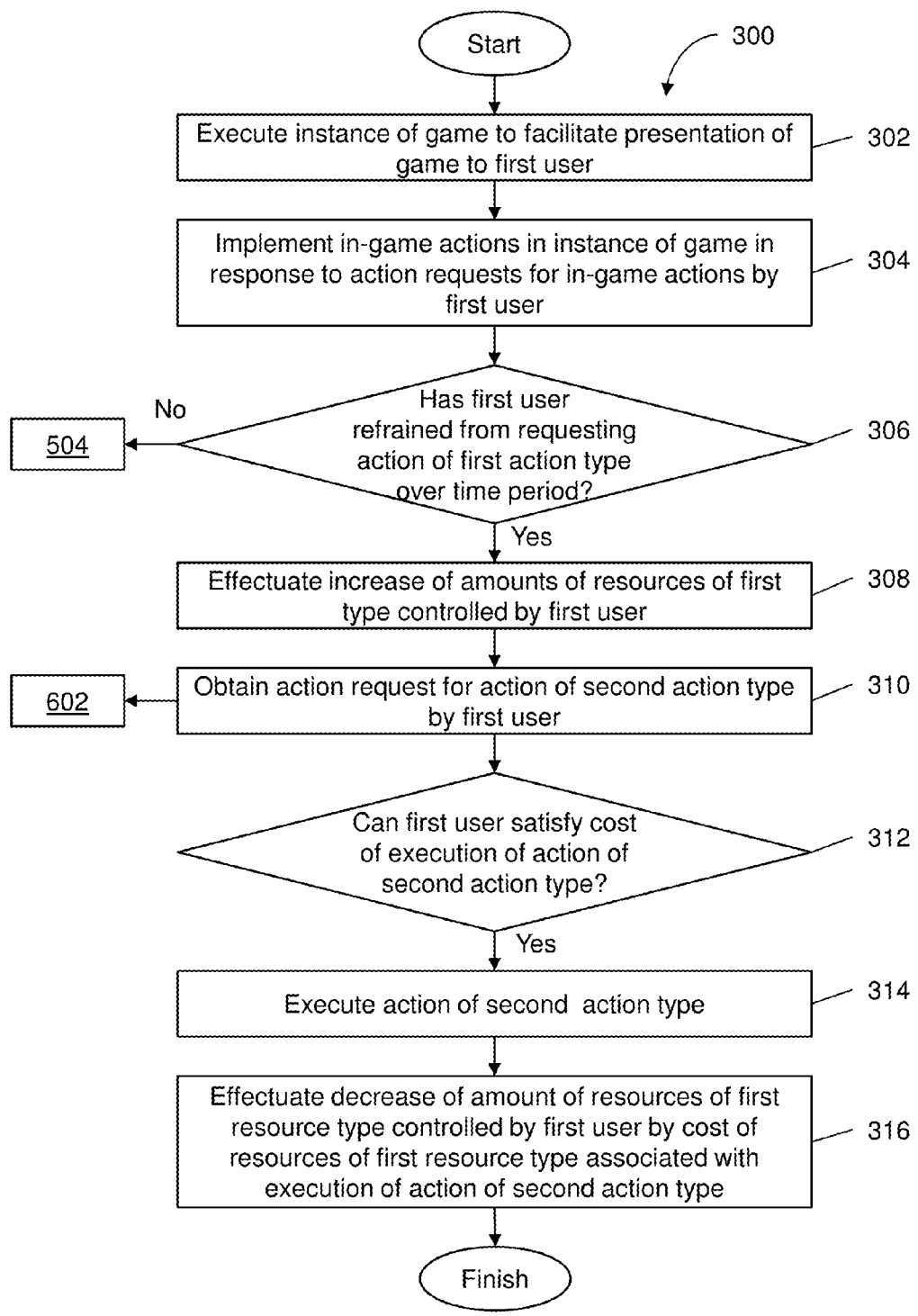
FIG. 3 illustrates a method for facilitating incentivized reduction of in-game actions by increasing an amount of resources of a first resource type controlled by a first user based on the first user refraining from requesting an action of a first action type, in accordance with one or more implementations.

FIG. 3 illustrates a method for facilitating incentivized reduction of in-game actions by increasing an amount of resources of a first resource type controlled by a first user based on the first user refraining from requesting an action of a first action type, in accordance with one or more implementations. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, an instance of a game may be executed to facilitate presentation of the game to a first user. The game may, for instance, include a plurality of resource types. The plurality of resource types may include a first resource type. Operation 302 may be performed by a game module that is the same as or similar to game module 106, in accordance with one or more implementations.

At an operation 304, in-game actions may be implemented in the instance of the game in response to action requests for the in-game actions by the first user. The in-game actions may include actions of a first action type and actions of a second action type. Actions of the second action type may be enhanced versions of actions of the first action type. Actions of the first action type and actions of the second action type may have individual costs in resources that are available in the game. Operation 304 may be performed by a game module that is the same as or similar to game module 106, in accordance with one or more implementations.

At an operation 306, a determination of whether the first user has refrained from inputting action requests for an action of the first action type over one or more time periods may be effectuated. The time periods may be time periods that are predetermined and fixed, time periods that are designated based on a level of the game, experience of the first user, and/or the time of the day, etc., and/or other time periods. As indicated, the time periods may include real-world time periods, in-game time periods, and/or other types of time periods. Operation 306 may be performed by a resource provisioning module that is the same as or similar to resource provisioning module 108, in accordance with one or more implementations. Responsive to a determination that the first user has refrained from inputting action requests for the action of the first action type over the time periods, method 300 may proceed to an operation 308. Responsive to a determination that the first user has inputted action requests for the action of the first action type during the time periods, method 300 may proceed to an operation 504 of method 500 in FIG. 5.

At operation 308, an increase of the amount of resources of the first resource type controlled by the first user may be effectuated. In some implementations, resources of the first resource type cannot be acquired via purchase and/or trade (e.g., purchases with virtual currencies, purchases with real-world currencies, trade for virtual items or services, trade for real-world items or services, etc.). Operation 308 may be performed by a resource provisioning module that is the same as or similar to resource provisioning module 108, in accordance with one or more implementations.

At an operation 310, an action request for the action of the second action type by the first user may be obtained. Operation 310 may be performed by a communication module that is the same as or similar to communication module 112, in accordance with one or more implementations. As shown, the method 300 may proceed to an operation 312 and/or an operation 602 of method 600 in FIG. 6.

At an operation 312, a determination of whether the amount of resources of the first resource type controlled by the first user is sufficient to satisfy the cost of resources of the first resource type associated with execution of the action of the second action type. Operation 312 may be performed by a game module that is the same as or similar to game module 106, in accordance with one or more implementations. Responsive to a determination that the amount of resources of the first resource type controlled by the first user is sufficient to satisfy the cost of resources of the first resource type associated with execution of the action of the second action type, method 300 may proceed to an operation 314.

At operation 314, the action of the second action type may be executed. Operation 314 may be performed by a game module that is the same as or similar to game module 106, in accordance with one or more implementations.

At an operation 316, a decrease of the amount of resources of the first resource type controlled by the first user may be effectuated such that the amount of resources of the first resource type controlled by the first user is decreased by the cost of resources of the first resource type associated with execution of the action of the second action type. Operation 316 may be performed by a resource provisioning module that is the same as or similar to resource provisioning module 108, in accordance with one or more implementations.

Figure 4:
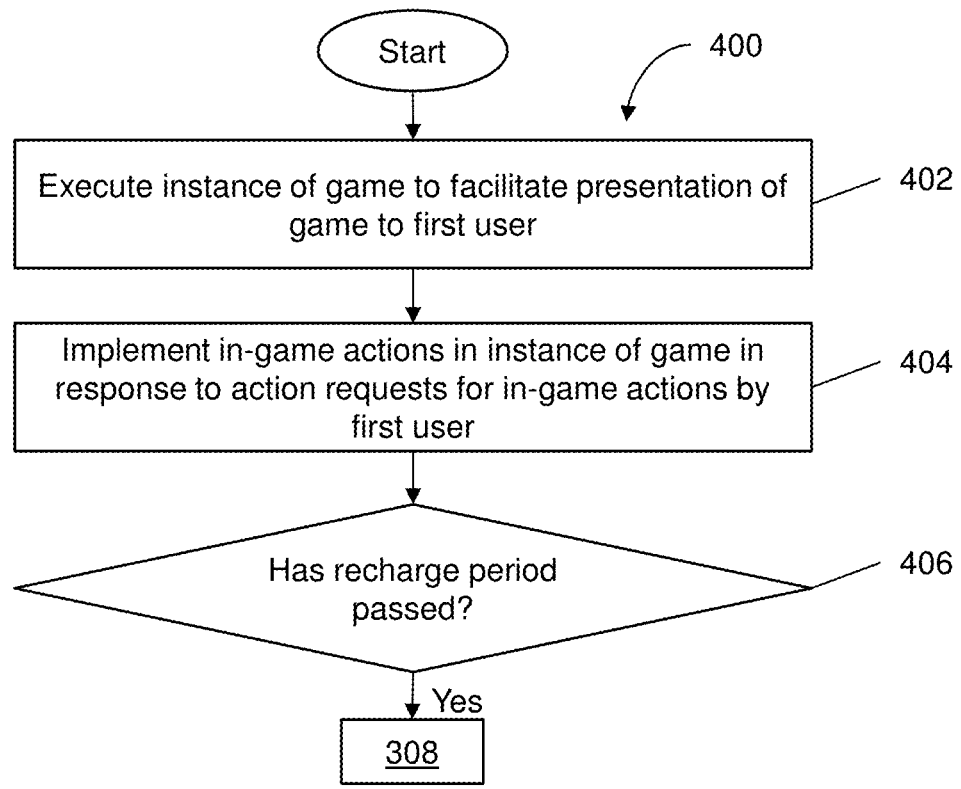
FIG. 4 illustrates a method for facilitating incentivized reduction of in-game actions by increasing an amount of resources of a first resource type based on passage of a recharge period, in accordance with one or more implementations.

FIG. 4 illustrates a method for facilitating incentivized reduction of in-game actions by increasing an amount of resources of a first resource type based on passage of a recharge period, in accordance with one or more implementations. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, an instance of a game may be executed to facilitate presentation of the game to a first user. The game may, for instance, include a plurality of resource types. The plurality of resource types may include a first resource type. Operation 402 may be performed by a game module that is the same as or similar to game module 106, in accordance with one or more implementations.

At an operation 404, in-game actions may be implemented in the instance of the game in response to action requests for the in-game actions by the first user. The in-game actions may include actions of a first action type and actions of a second action type. Actions of the second action type may be enhanced versions of actions of the first action type. Actions of the first action type and actions of the second action type may have individual costs in resources that are available in the game. Operation 404 may be performed by a game module that is the same as or similar to game module 106, in accordance with one or more implementations.

At an operation 406, a determination of whether one or more recharge periods have passed may be effectuated. As indicated, the recharge periods may include real-world time periods, in-game time periods, and/or other types of time periods. Operation 406 may be performed by a resource provisioning module that is the same as or similar to resource provisioning module 108, in accordance with one or more implementations. Responsive to a determination that the recharge periods have passed, method 400 may proceed to an operation 308.

Figure 5:
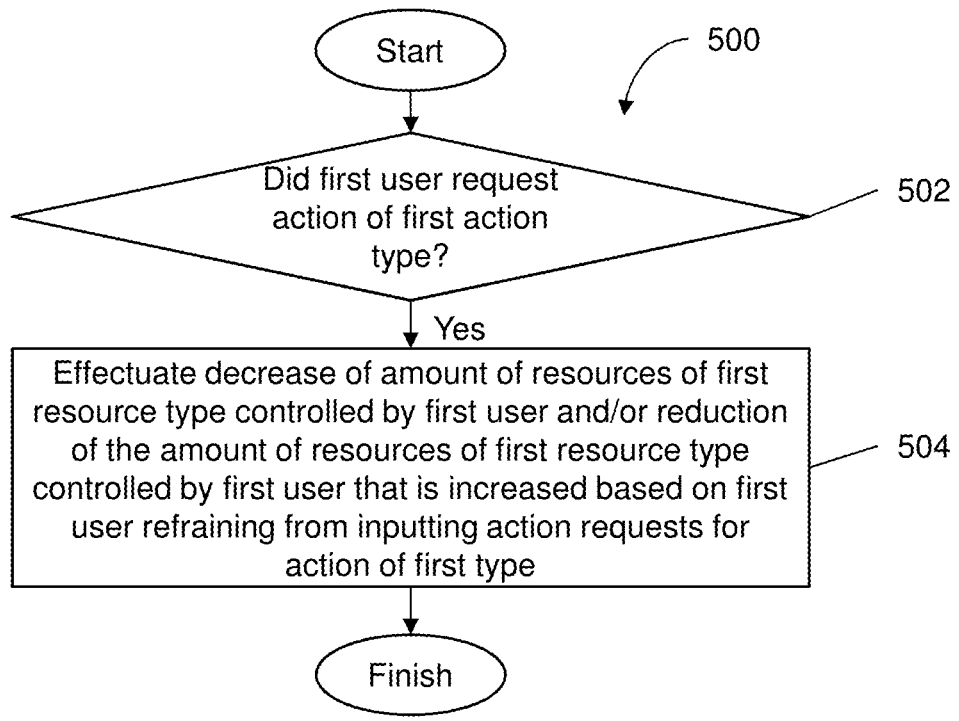
FIG. 5 illustrates a method for reducing action requests for an action of a first action type, in accordance with one or more implementations.

FIG. 5 illustrates a method for reducing action requests for an action of a first action type, in accordance with one or more implementations. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, a determination of whether the first user has input an action request for the action of the first action type may be effectuated. Operation 502 may be performed by a game module that is the same as or similar to game module 106, in accordance with one or more implementations. Responsive to a determination that the first user has input an action request for the action of the first action type, method 500 may proceed to an operation 504.

At operation 504, a decrease of the amount of resources of the first resource type controlled by the first user and/or a reduction of the amount of resources of the first resource type controlled by the first user that is increased based on the first user refraining from inputting action requests for the action of the first action type may be effectuated. Operation 504 may be performed by a resource provisioning module that is the same as or similar to resource provisioning module 108, in accordance with one or more implementations.

Figure 6:
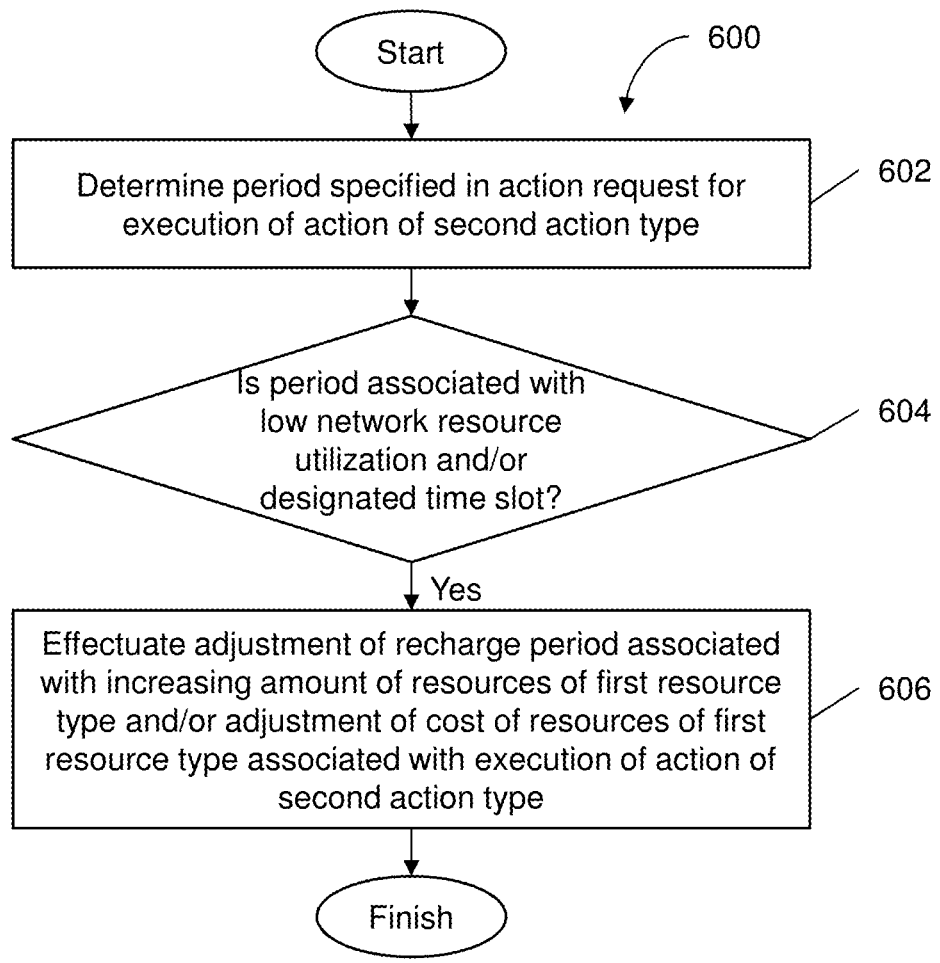
FIG. 6 illustrates a method for encouraging action requests that specify execution of an action of a second action type during periods associated with low network resource utilization or periods associated with time slots designated for adjustments, in accordance with one or more implementations.

FIG. 6 illustrates a method for encouraging action requests that specify execution of an action of a second action type during periods associated with low network resource utilization or periods associated with time slots designated for adjustments, in accordance with one or more implementations. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, one or more periods specified in an action request for execution of the action of the second action type may be determined. Operation 602 may be performed by a game module that is the same as or similar to game module 106, in accordance with one or more implementations.

At an operation 604, a determination of whether the periods are periods associated with low network resource utilization and/or a period associated with time slots designated for adjustments. Operation 604 may be performed by a resource provisioning module that is the same as or similar to resource provisioning module 108, in accordance with one or more implementations. Responsive to a determination that that the periods are periods associated with low network resource utilization and/or a period associated with time slots designated for adjustments, the method 600 may proceed to an operation 606.

At operation 606, an adjustment of a recharge period associated with increasing the amount of resources of the first resource type controlled by the first user and/or an adjustment of the cost of resources of the first resource type associated with execution of the action of the second action type may be effectuated. Operation 606 may be performed by a resource provisioning module that is the same as or similar to resource provisioning module 108, in accordance with one or more implementations.

Figure 7:
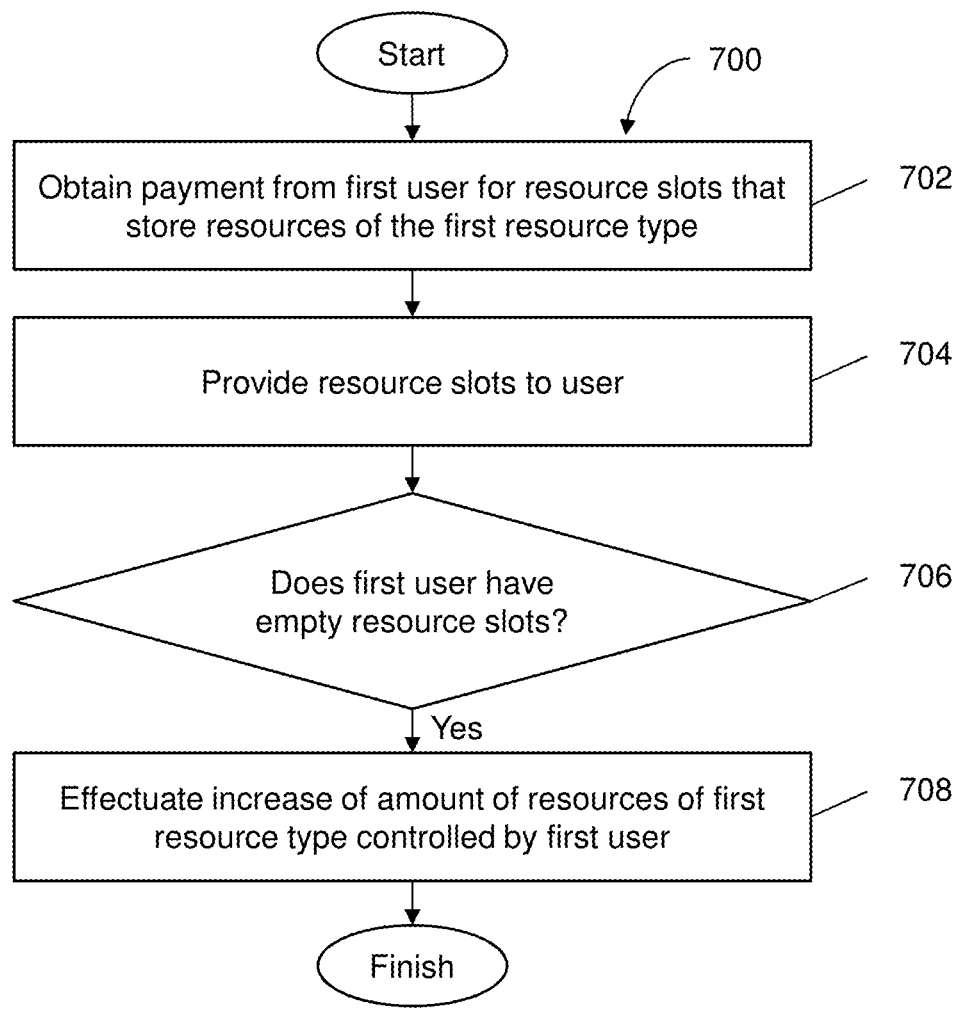
FIG. 7 illustrates a method for incentivizing purchases relating to resources of a first resource type, in accordance with one or more implementations.

FIG. 7 illustrates a method for incentivizing purchases relating to resources of a first resource type, in accordance with one or more implementations. The operations of method 700 presented below are intended to be illustrative. In some embodiments, method 700 may be accomplished with one or more additional operations not described, and/or without one or more of the operations discussed. Additionally, the order in which the operations of method 700 are illustrated in FIG. 7 and described below is not intended to be limiting.

In some embodiments, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At an operation 702, payment for one or more resource slots that store resources of the first resource type may be obtained from the first user. Operation 702 may be performed by a payment module that is the same as or similar to payment module 114, in accordance with one or more implementations.

At an operation 704, the resource slots may be provided to the user. Operation 704 may be performed by a resource provisioning module that is the same as or similar to resource provisioning module 108, in accordance with one or more implementations.

At an operation 706, a determination of whether the first user has one or more empty resource slots. Operation 706 may be performed by a resource provisioning module that is the same as or similar to resource provisioning module 108, in accordance with one or more implementations. Responsive to a determination that the first user has one or more empty resource slots, the method 700 may proceed to an operation 708.

At operation 708, the increase of the amount of resources of the first resource type controlled by the first user may be effectuated. Operation 708 may be performed by a resource provisioning module that is the same as or similar to resource provisioning module 108, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for hosting an online game, and for enhancing server availability, the system comprising:
 a game server including one or more physical processors configured by machine-readable instructions to:

execute an instance of a game to generate information for transmission over a network to a first client computing platform to facilitate presentation of the game to a first user on the first client computing platform, and to implement in-game actions in the instance of the game in response to action requests for the in-game actions by the first user, wherein the in-game actions include actions of a first action type and actions of a second action type, wherein actions of the second action type are enhanced versions of actions of the first action type, and wherein actions of the first action type and actions of the second action type have individual costs in resources that are available in the game, and wherein the game includes a plurality of resource types, the plurality of resource types including a first resource type;

initiate transmission over the network of the information generated by the execution of the instance of the game to the first client computing platform, and to receive over the network from the first client computing platform action requests input by the first user on the first client computing platform, wherein action requests specify execution of in-game actions;

maintain user resource records, the user resource records including a first resource record for the first user that indicates amounts of resources of the individual ones of the plurality of resource types that the first user controls in the game including an amount of resources of the first resource type; and determine whether the action requests received over the network from the first client computing platform during one or more time periods is for an action; and effectuate, in response to a determination that no action requests for an action of the first action type was received from the first client computing platform during the one or more time periods, an increase of the amount of resources of the first resource type controlled by the first user, wherein transmission over the network is initiated to the first client computing platform of information that causes the first client computing platform to present the increase of the amount of resources of the first resource type controlled by the first user, wherein execution of an action of the second action type has a cost of resources of the first resource type such that in response to reception of an action request from the first client computing platform requesting an action of the second action type, the action of the second action type is implemented in the instance of the game and the amount of resources of the first resource type controlled by the first user is reduced by the cost of the action of the second action type, and wherein transmission over the network is initiated to the first client computing platform of information that causes the first client computing platform to present to the first user a result of the action of the second action type, and the reduction in the amount of resources of the first resource type controlled by the first user.

2. The system of claim 1, wherein the one or more processors are further configured by machine-readable instructions to obtain an action request for the action of the second action type by the first user; and to execute the action of the second action type responsive to a determination that the amount of resources of the first resource type controlled by the first user is sufficient to satisfy the cost of resources of the first resource type associated with execution of the action of the second action type.

3. The system of claim 2, wherein the one or more processors are further configured by machine-readable instructions to, in response to a determination that the action request for the action of the second action type specifies execution of the action of the second action type during one or more of periods associated with low network resource utilization or periods associated with time slots designated for adjustments, effectuate one or more of an adjustment of a recharge period associated with increasing the amount of resources of the first resource type controlled by the first user or an adjustment of the cost of resources of the first resource type associated with execution of the action of the second action type.

4. The system of claim 1, wherein resources of the first resource type cannot be acquired via one or more of purchase or trade.

5. The system of claim 1, wherein the one or more processors are further configured by machine-readable instructions to obtain payment from the first user for one or more resource slots that store resources of the first resource type, and wherein increasing the amount of resources of the first resource type controlled by the first user is responsive to the first user having one or more empty resource slots.

6. The system of claim 1, wherein the one or more processors are further configured by machine-readable instructions to, in response to an action request for the action of the first action type by the first user, effectuate one or more of a decrease of the amount of resources of the first resource type controlled by the first user or a reduction of the amount of resources of the first resource type controlled by the first user that is increased based on the first user refraining from inputting action requests for the action of the first action type.

7. The system of claim 1, wherein the one or more processors are further configured by machine-readable instructions to effectuate a decrease of the amount of resources of the first resource type controlled by the first user responsive to execution of the action of the second action type, such that the amount of resources of the first resource type controlled by the first user is decreased by the cost of resources of the first resource type associated with execution of the action of the second action type.

8. The system of claim 1, wherein actions of the second action type are associated with greater benefits to the users than corresponding actions of the first action type.

9. The system of claim 1, wherein the time periods include one or more in-game time periods.

10. A computer-implemented method for hosting an online game, and for enhancing server availability, the method being implemented in a computer system that includes one or more physical processors configured by machine-readable instructions, the method comprising:

executing, using the one or more processors, an instance of a game to generate information for transmission over a network to a first client computing platform to facilitate presentation of the game to a first user on the first client computing platform;

implementing, using the one or more processors, in-game actions in the instance of the game in response to action requests for the in-game actions by the first user, wherein the in-game actions include actions of a first action type and actions of a second action type, wherein actions of the second action type are enhanced versions of actions of the first action type, wherein actions of the first action type and actions of the second action type have individual costs in resources that are available in the game, and wherein the game includes a plurality of resource types, the plurality of resource types including a first resource type;

initiating transmission over the network, using the one or more processors, of the information generated by the execution of the instance of the game to the first client computing platform, and to receive over the network from the first client computing platform action requests input by the first user on the first client computing platform, wherein action requests specify execution of in-game actions;

maintaining, using the one or more processors, user resource records, the user resource records including a first resource record for the first user that indicates amounts of resources of individual ones of the plurality of resource types that the first user controls in the game including an amount of resources of the first resource type;

determining, using the one or more processors, whether the action requests received over the network from the first client computing platform during one or more time periods is for an action of the first action type; and effectuating, using the one or more processors, in response to a determination that no action requests for an action of the first action type was received from the first client computing platform during one or more time periods, an increase of the amount of resources of the first resource type controlled by the first user, wherein the initiated transmission over the network to the first client computing platform of information that is further configured to cause the first client computing platform to present the increase of the amount of resources of the first resource type controlled by the first user, wherein execution of an action of the second action type has a cost of resources of the first resource type such that in response to reception of an action request from the first client computing platform requesting an action of the second action type, the implementation of the second action type in the instance of the game reduces the amount of resources of the first resource type controlled by the first user by the cost of the action of the second action type, and wherein the initiated transmission over the network to the first client computing platform of information is further configured to cause the first client computing platform to present to the first user a result of the action of the second action type, and the reduction in the amount of resources of the first resource type controlled by the first user.

11. The method of claim 10, further comprising:

obtaining an action request for the action of the second action type by the first user; and executing the action of the second action type responsive to a determination that the amount of resources of the first resource type controlled by the first user is sufficient to satisfy the cost of resources of the first resource type associated with execution of the action of the second action type.

12. The method of claim 11, further comprising in response to a determination that the action request for the action of the second action type specifies execution of the action of the second action type during one or more periods associated with low network resource utilization or periods associated with time slots designated for adjustments, effectuating one or more of an adjustment of a recharge period associated with increasing the amount of resources of the first resource type controlled by the first user or an adjustment of the cost of resources of the first resource type associated with execution of the action of the second action type.

13. The method of claim 10, wherein resources of the first resource type cannot be acquired via one or more of purchase or trade.

14. The method of claim 10, further comprising obtaining payment from the first user for one or more resource slots that store resources of the first resource type, wherein increasing the amount of resources of the first resource type controlled by the first user is responsive to the first user having one or more empty resource slots.

15. The method of claim 10, further comprising effectuating a decrease of the amount of resources of the first resource type controlled by the first user responsive to execution of the action of the second action type, such that the amount of resources of the first resource type controlled by the first user is decreased by the cost of resources of the first resource type associated with execution of the action of the second action type.

16. The method of claim 10, wherein actions of the second action type are associated with greater benefits to the users than corresponding actions of the first action type.

17. A system for hosting an online game, and for enhancing server availability, the system comprising:

a game server including one or more physical processors configured by machine-readable instructions to:

execute an instance of a game to generate information for transmission over a network to a first client computing platform to facilitate presentation of the game to a first user on the first client computing platform, and to implement in-game actions in the instance of the game in response to action requests for the in-game actions by the first user, wherein the in-game actions include actions of a first action type and actions of a second action type, wherein actions of the second action type are enhanced versions of actions of the first action type, and wherein actions of the first action type and actions of the second action type have individual costs in resources that are available in the game, and wherein the game includes a plurality of resource types, the plurality of resource types including a first resource type;

initiate transmission over the network of the information generated by the execution of the instance of the game to the first client computing platform, and to receive over the network from the first client computing platform action requests input by the first user on the first client computing platform, wherein action requests specify execution of in-game actions;

maintain user resource records, the user resource records including a first resource record for the first user that indicates amounts of resources of the individual ones of the plurality of resource types that the first user controls in the game including an amount of resources of the first resource type;

determine whether the action requests received over the network from the first client computing platform during one or more recharge periods for an action of the first action type; and effectuate, in response to a determination that no for an action of the first action type was received from the first client computing platform during the one or more recharge periods, an increase of the amount of resources of the first resource type controlled by the first user, wherein transmission over the network is initiated to the first client computing platform of information that causes the first client computing platform to present the increase of the amount of resources of the first resource type controlled by the first user, wherein execution of an action of the second action type has a cost of resources of the first resource type such that in response to reception of an action request from the first client computing platform requesting an action of the second action type, the action of the second action type is implemented in the instance of the game and the amount of resources of the first resource type controlled by the first user is reduced by the cost of the action of the second action type, and wherein transmission over the network is initiated to the first client computing platform of information that causes the first client computing platform to present to the first user a result of the action of the second action type, and the reduction in the amount of resources of the first resource type controlled by the first user.

18. The system of claim 17, wherein the one or more processors are further configured by machine-readable instructions to obtain an action request for the action of the second action type by the first user; and to execute the action of the second action type responsive to a determination that the amount of resources of the first resource type controlled by the first user is sufficient to satisfy the cost of resources of the first resource type associated with execution of the action of the second action type.

19. The system of claim 18, wherein the one or more processors are further configured by machine-readable instructions to, in response to a determination that the action request for the action of the second action type specifies execution of the action of the second action type during one or more of periods associated with low network resource utilization or periods associated with time slots designated for adjustments, effectuate one or more of an adjustment of a recharge period associated with increasing the amount of resources of the first resource type controlled by the first user or an adjustment of the cost of resources of the first resource type associated with execution of the action of the second action type.

20. The system of claim 17, wherein resources of the first resource type cannot be acquired via one or more of purchase or trade.

\* \* \* \* \*